Dec. 2, 1941.  A. E. LARSEN  2,264,943
AIRCRAFT EQUIPPED WITH SUSTAINING ROTORS
Filed Oct. 4, 1940  2 Sheets-Sheet 1

INVENTOR
Agnew E. Larsen
BY
Synnestvedt & Lechner
ATTORNEYS

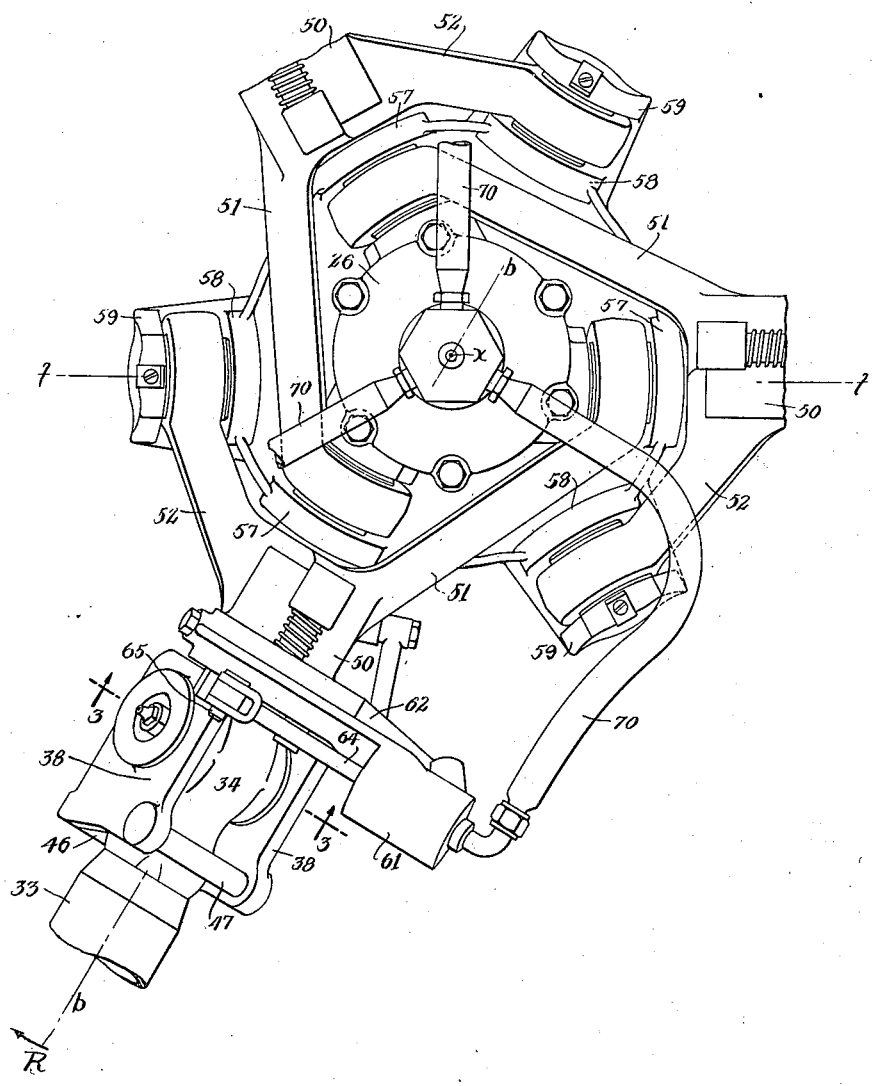

Patented Dec. 2, 1941

2,264,943

UNITED STATES PATENT OFFICE 2,264,943

AIRCRAFT EQUIPPED WITH SUSTAINING ROTORS

Agnew E. Larsen, Jenkintown, Pa., assignor to Autogiro Company of America, Willow Grove, Pa., a corporation of Delaware Application October 4, 1940, Serial No. 359,677

17 Claims. (Cl. 244—18)

This invention relates to aircraft equipped with a sustaining rotor or rotors, and is particularly concerned with a sustaining rotor the blades of which are pivotally connected with the rotative hub.

The present application contains subject matter common to my copending applications Serial No. 238,729, filed November 4, 1938, and Serial No. 271,841, filed May 5, 1939, the former of which issued November 5, 1940, as Patent No. 2,220,109.

In general, the invention has in view a blade pivot arrangement affording a number of novel advantages fully analyzed hereinafter, the invention being applicable to sustaining rotors which are intended to be autorotationally actuated during normal flight, or which are adapted to be mechanically driven through the hub during normal flight, or to sustaining rotors capable of both types of operation under different conditions.

While most features of the invention are of use in sustaining rotors of a variety of types, the invention is especially suitable to that type of sustaining rotor which is capable of effecting "direct" or jump take-off. In an aircraft in which the rotor is normally autorotationally actuated, jump take-off may be effected in the manner briefly outlined just below.

The type of aircraft just mentioned commonly incorporates an engine driving a forward propulsion airscrew (for inducing translational flight), and further includes a manually disconnectible drive between the engine and the rotor hub. In addition, the rotor blades are mounted with freedom for pitch change movement and the direct or jump take-off is secured by reducing the blade pitch to a non-lifting angle, preferably zero, and then driving the rotor to a high speed while on the ground, preferably to a R. P. M. considerably higher than the normal autorotational R. P. M. of flight. This stores a large quantity of excess kinetic energy in the rotor which is converted to lift by increase of blade pitch at the moment of take-off, resulting in substantially vertical or direct take-off.

In a machine in which a single normally autorotationally actuated rotor is employed, the rotor drive clutch is disconnected at or just before the moment of take-off so as to eliminate the rotor driving torque and thereby avoid the counter torque effect. If the rotor drive is not disconnected at the moment of take-off, some means for counteracting the reactive torque are necessary, such as two rotors turning in opposite directions.

The structure herein disclosed accomplishes a number of objects and advantages set out in my copending applications above referred to. In addition, the present invention accomplishes other objects pointed out hereinafter.

The invention provides a blade mounting mechanism, especially the blade mounting pivots, so arranged as to minimize vibrations, flutter, and resonance conditions which, in some rotors, have a tendency to be set up particularly when driving the rotor on the ground in preparation for take-off with the blade pitch reduced to zero.

Another important object of the invention is the arrangement of a plurality of blade pivots for each blade in a manner providing interaction or correlated movements of the blades about the several pivots, so as to secure improved operation under various conditions.

The manner in which the blade mounting mechanism of the present invention achieves the foregoing and other advantageous results can best be understood after consideration of the following description of the preferred embodiment of the structure, as illustrated in the accompanying drawings. Therefore, for full statement and explanation of the objects and advantages of the invention attention is directed to the analysis of the structure and its functioning presented hereinafter following the description of the drawings.

In the drawings—

Figure 2 is a top plan view of the mechanism shown in Figure 1; and

Figure 1:
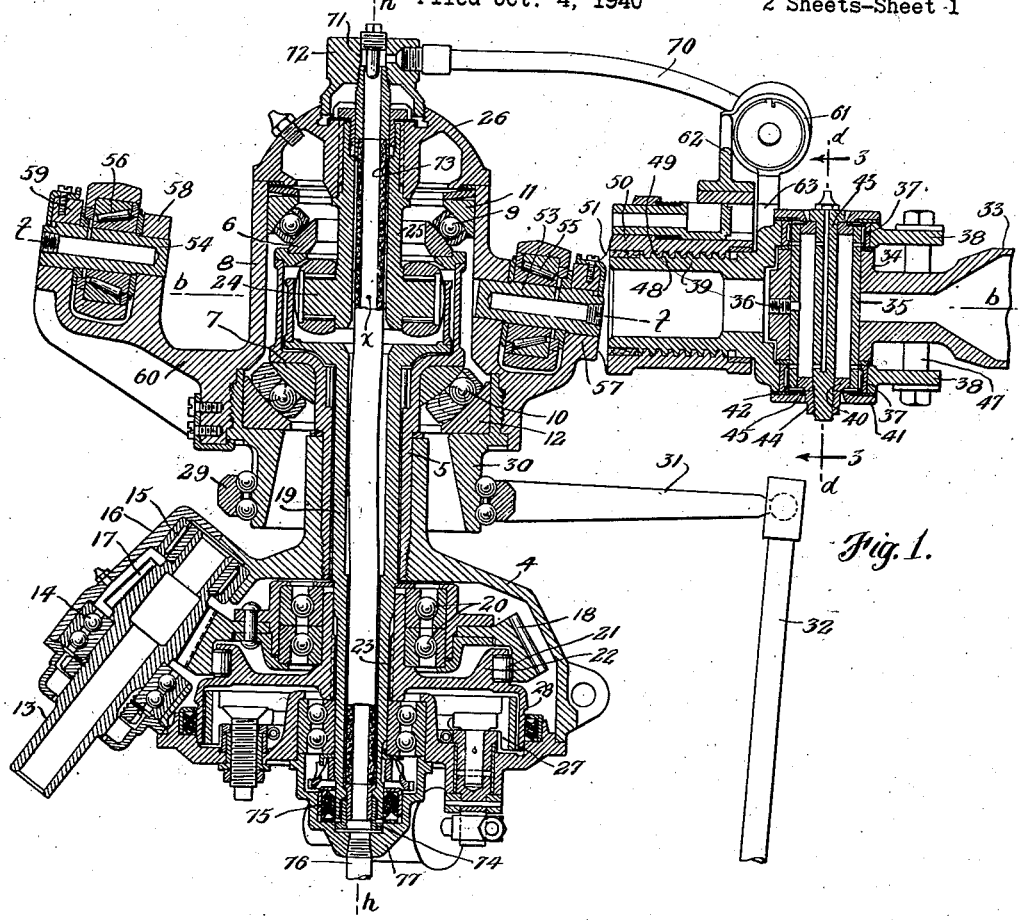
Figure 1 is a vertical sectional view through a rotor hub and associated blade mounting mechanism incorporating the invention.

The non-rotative hub support 4 is adapted to be arranged at the top of the body of the aircraft and serves to mount the non-rotative hub spindle 5 which projects upwardly and is provided with parti-spherical bearing races 6 and 7 struck from a center point $x$. The rotative hub member 8 is journalled on the bearing races 6 and 7 by means of ball bearings 9 and 10 which cooperate with additional parti-spherical races 11 and 12 carried by the hub member 8.

The several blades of the rotor are pivotally connected with this hub member 8 by means of pivots hereinafter fully described, but before considering the blade pivot mechanism attention is called to the fact that provision is made for driving the rotor. The drive mechanism includes a driving shaft 13 which is adapted to be coupled with the forward propulsion engine hereinbefore referred to, the drive transmission including a manually disconnectible clutch having a clutch operating lever or the like (not shown), and preferably also including an overrunning clutch, described shortly hereinafter. Shaft 13 is journaled by bearings 14 and 15 in a housing 16 formed as a part of the fixed rotor support 4, and this shaft (13) carries a driving pinion 17 adapted to mesh with a ring gear 18 which is journalled on a lower part of the central rotor drive shaft 19 by means of bearings 20. Torque is adapted to be transmitted from the ring gear 18 to the driving shaft 19 through an overrunning clutch comprising overrunning rollers 21 working between an inner surface of the gear 18 and a series of inclined surfaces formed on a part 22 which is splined to the drive shaft 19 at 23. The roller elements 21 of the overrunning clutch serve to transmit the driving torque in one direction only, thereby ensuring freedom for autorotative actuation of the rotor under conditions when that is desired.

Toward its upper end the driving shaft 19 is provided with a universal joint generally indicated at 24, the joint being centered on the center point $x$ above referred to. Extending upwardly from the universal joint is a driving connection 25 which is splined with a hub cap 26, the hub cap, in turn, being secured to the hub member 8.

A braking force may be applied to the rotor through the medium of the internal expanding brake 27 which cooperates with a drum 28 formed with part 22 above referred to through which the driving torque is also transmissible.

Referring again to the spherical bearings 9 and 10 by means of which the rotative hub 8 is mounted on the non-rotative hub spindle 5, attention is called to the fact that these bearings not only provide for rotation of the rotor but also provide freedom for tilting movement of the rotor hub in all directions. That tilting movement is employed for control or maneuvering purposes and to that end a control ring 29 is journalled on a downward extension 30 of the rotative hub, the ring carrying appropriate control arms, one of which appears at 31, by means of which the hub may be tilted in any desired direction, for instance through the medium of a push-pull connection 32 coupled to the pilot's control stick in the manner fully disclosed in my copending application Serial No. 209,511, filed May 23, 1938.

The portions of the hub above referred to are described somewhat briefly, since they form no part of the present invention per se, and further since they are fully described in my copending applications above referred to.

Turning now to the mounting of the blades on the hub, it is first pointed out that each blade is connected with the hub by means of three pivot mountings, i. e., a "flapping" pivot, a "drag" pivot, and a pitch change pivot.

The flapping pivot is arranged to provide primarily for swinging movements of the blade in a direction generally transverse the mean rotative path of travel. The drag pivot is arranged to provide primarily for lag-lead movements of the blade, that is, fore and aft movements generally within the rotative path of travel of the blade. The patch change mounting provides for movement of the blade about its own longitudinal axis to different pitch positions, the movement about this pivot preferably being controllable for various purposes, especially for the purpose of effecting direct take-off as above described.

The root end or shank 33 of each blade is provided with an apertured block 34 through which the drag pivot pin 35 extends, this pin being fixed in block 34 as by a set screw 36. The projecting ends of the drag pivot 35 cooperate with needle bearings 37 which are mounted in apertures formed in upper and lower lugs 38—38 integral with and projecting outwardly from a sleeve member 39. At each end of the drag pivot 35 there is arranged a part 40 having a flange 41 overlying the adjacent portion of the lugs 38. At each end of the drag pivot, moreover, a friction washer 42 is interposed between the flange 41 and the lug 38, and this assembly is secured together by means of a through bolt 43 and a cooperating nut 44 which serves as a means of adjustment for the friction imposed on movement of the blade about the drag pivot axis (indicated at $d$—$d$ in Figure 1, and in two other positions at $d'$—$d'$ and $d^2$—$d^2$ in Figure 3). Rotation of the parts 40—40 with reference to the drag pivot pin 35 is prevented by means of pins 45.

Because of the obliquity of the drag pivot (hereinafter more fully described) and further because of the employment of frictional restraint, the lugs 38—38 for mounting the drag pivot are preferably interbraced by a web 46 and also by a pin 47 (see Figures 2 and 3), such arrangement being disclosed and claimed in copending application of Gage W. Tidd, Serial No. 361,420, filed October 16, 1940.

Attention is here called to the fact that while the drag pivot axis appears in a vertical position $d$—$d$ as seen in Figure 1, that is merely the position for blade folding, to which the pivot can be shifted, in accordance with the disclosure of my copending application Serial No. 238,729, above mentioned. The normal flight position of the drag pivot axis is indicated at $d'$—$d'$ in Figure 3, the same being inclined upwardly and forwardly with respect to the blade, the direction of rotation being indicated by the arrow R in Figure 2. Shifting of the drag pivot axis to different positions is provided for by the pitch change mounting described just below.

As seen in Figure 1, the sleeve 39 (which carries the lugs 38—38 and web 46 forming a three-sided box for mounting the drag pivot) is equipped with an external worm or thread 48 which cooperates with an internal thread 49 formed on a sleeve 50 which is integral or rigid with a blade mounting fork having long and short prongs 51 and 52, respectively.

The threaded connection between parts 39 and 50 provides freedom for pitch change movement of the blade substantially about its longitudinal axis $b$—$b$. The control for pitch change movement is described herebelow.

The prongs 51 and 52 of the blade mounting fork extend to embrace the hub 8, the prongs being pivoted on pins 53 and 54, by means of bearings 55 and 56. One end of pin 53 is carried in an aperture formed in the hub member 8 and the other end is carried by an apertured lug 57 projecting from the hub. The two ends of pin 54 are carried by apertured lugs 58 and 59 both of which are carried by a bracket 60 projecting from the hub. The two pins 53 and 54 are aligned and positioned to provide a flapping axis $f$—$f$ referred to more fully herebelow.

For the purpose of controlling the pitch position of the blade about the axis of threaded parts 39—50, a pitch control cylinder 61 is mounted by means of a bracket 62 on the sleeve 50. An arm 63 projects upwardly from sleeve 39 outboard of sleeve 50 and a link or piston rod 64 is pivotally connected to this arm at 65. The piston rod is adapted to project through a cap 66 into the cylinder 61 and abut the piston 67.

Stop members 68 and 69 serve to limit movement of the arm 63 and thus to control the limits of pitch change movement of the blade. These stops 68 and 69 are adapted to be retracted radially inwardly so as to permit extreme angular movement of the drag pivot axis into an approximately vertical position, as above mentioned, in order to permit folding of the blade in the manner described in my copending application Serial No. 238,729. However, since this mechanism forms no part of the present invention per se, it is not described in detail herein.

For the purpose of controlling the pitch within the limits imposed by the stops 68 and 69, fluid pressure may be admitted and released from cylinder 61 through connection 70 which comprises a flexible tube extending inwardly from the cylinder 61 for connection with a chamber 71 formed in member 72 at the top of the hub. A fluid pressure connection comprising a flexible tube 73 (which connection is common to all of the blades) extends downwardly centrally through the hub and through the universal joint 24, the lower end of the tube being secured to the lower end of the drive shaft 19 as at 74. A sealing ring 75 avoids loss of fluid between the rotative parts of the fluid connection (tube 73 and joint 74) and the non-rotative fluid connection 76 which is joined with the closure cap 77 at the bottom of the hub.

Connection 76 is adapted to be coupled with a source of fluid under pressure, the connection being made through suitable controlling valves and the like as shown, for example, in the copending application of James G. Ray, Serial No. 91,838, filed July 22, 1936 (now Patent No. 2,216,163, issued October 1, 1940), or in my copending application Serial No. 349,066, filed August 1, 1940. Reference may be had to said copending applications for more detailed description and disclosure of the fluid pressure control elements not herein illustrated. Since the elements of this system not herein illustrated form no part of the present invention per se, they are only briefly referred to below.

The control system preferably includes a controllable valve for establishing the "pressure-on" and the "pressure-off" conditions. It is also desirable and contemplated that the control for this valve shall be coupled or interlocked with the control provided for the manually operable rotor drive clutch, the sense of interlock being such that upon actuation of the common control in one sense the rotor driving clutch is connected and fluid pressure is delivered to the pitch controlling cylinder 61, and so that upon actuation of the common control in the other sense the rotor driving clutch is disconnected and the pressure in the system is relieved.

Figure 3:
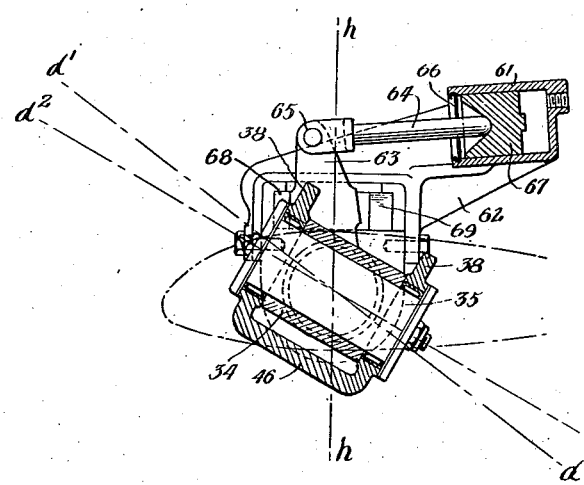
Figure 3 is a sectional view of certain parts of the blade mounting, taken as indicated by the section line 3—3 on Figures 1 and 2.

To consider the effect of this, reference is again made to the worm thread mounting of parts 39 and 50, and it is to be kept in mind that the sense of threading of these parts provides for radially inward movement of the blade upon rotation of the blade on the threaded mounting in a direction to decrease the blade pitch. The stop 68 is so located as to provide a non-lifting pitch angle, preferably zero pitch, the stop 69 being set to define the normal autorotational pitch setting, for example about 5° to 6°. (It may here be noted that as shown in Figure 3, the zero pitch position defined by stop 68 corresponds to the position of the drag pivot axis indicated at $d^2$—$d^2$, the other position—for flight—corresponding to the position of the drag pivot axis indicated at $d'$—$d'$.)

Upon application of the pressure, therefore, the blades are all caused to turn on their threaded mountings to the zero pitch position, and when the common control for the fluid pressure system and for the rotor drive clutch is actuated to disconnect the clutch and relieve the pressure, the action of centrifugal force on the blades tends to draw the blades radially outwardly, in consequence of which the blades are caused to increase their pitch to the point defined by the limiting stops 69.

Direct take-off is accomplished in accordance with the foregoing, and preferably the rotor is driven to a speed considerably in excess of the normal autorotational speed in order to store a substantial excess of kinetic energy which may be converted to lift at the time of pitch increase.

Turning again to the blade mounting pivots, it is first noted that the axis of the drag pivot 35 lies substantially in a plane perpendicular to the longitudinal axis $b$—$b$ of the blade (as may be seen at $d$—$d$ in Figure 1), but is inclined with reference to the plane perpendicular to the hub axis $h$—$h$, so that its upper end slopes forwardly in the direction of rotation.

Certain advantages and effects of this general type of inclination of a drag pivot (notably, aerodynamic damping of blade movement) are more fully set out in James A. J. Bennett Patent No. 2,121,536, issued June 21, 1938.

In considering the action of this pivot alone, attention is called to the fact that by virtue of the particular upward and forward inclination lag-lead movements of the blade are accompanied by movement in the flapping sense, movement of the blade in the leading sense being accompanied by downward flapping movement, and movement of the blade in the lagging sense being accompanied by upward flapping movement. By virtue of these compound movements, a very powerful centrifugal centering effect is provided, which resists lag-lead movement of the blade. For purposes of analysis, this centering effect may be resolved into two components, as follows:

First—since lagging or leading movement of the blade tends to cause the blade to rise above or fall the mean plane of rotation, a powerful centrifugal restoring moment acting in a vertical plane serves to restrict lag-lead movement of the blade. This force is particularly effective in resisting lag-lead movement of the blade at times when the rotor is being driven or when the rotor brake is applied. The torque effect when driving the rotor or when applying the brake introduces a substantial force tending to cause the blade to lag or lead, and excessive lagging or leading is restricted by virtue of the restoring moment of centrifugal force acting in a vertical plane.

Second—centrifugal force also acts on the blade in its plane of rotation by virtue of the fact that the drag pivot axis is offset or spaced substantially from the axis of the hub, and this further contributes to the centrifugal centering effect acting to maintain the blade in a mid position with reference to lag-lead movement.

Turning now to the flapping pivot 53—54, attention is first called to the fact that the axis *f—f* of this pivot is of compound obliquity, being inclined in a manner forming an acute angle with the longitudinal axis *b—b* of the blade at the leading side of the latter and in a manner which disposes the leading end of the pivot higher than the trailing end thereof, which has certain known advantages mentioned in Juan de la Cierva's Patent No. 1,811,303, issued June 23, 1931.

It will be observed that in the present case the flapping axis is radially offset slightly from the hub axis (as seen in Figure 2), and is further offset slightly above the center of tilt *x* of the rotative hub member (as seen in Figure 1).

In addition to certain advantages mentioned hereinafter which arise by virtue of conjoint use of the flapping and drag pivots, the radial offset of the flapping pivot axis is of advantage in setting up a force tending to resist tilting movement of the hub through the control system above mentioned. This, in turn, enables the pilot to "feel" the action of the rotor in his controls during flight maneuvers.

The slight vertical offset of the axis of the flapping pivot from the center of tilt of the hub is employed so that in the average coning position of the blades in normal flight, the blade axes substantially intersect the center of tilt of the hub, which has the effect of minimizing the transmission of vibrations or the like from the blades to the hub and from there to the pilot's control system.

One of the desirable advantages of the oblique flapping pivot considered alone, is that the angle of the pivot when viewed in plan provides for decrease of blade pitch upon upward flapping movement and increase of blade pitch upon downward flapping movement. The increase of pitch angle with decrease of coning angle is of especial advantage in the jump take-off maneuver for the following reason:

As hereinbefore indicated, for direct take-off, it is preferable to drive the rotor to a speed considerably in excess of the normal autorotational speed. This results in a large increase in the centrifugal force acting on the blades which causes them to maintain a smaller coning angle. Thus, when the blade pitch is increased at the moment of take-off the coning angle is smaller than after the rotor has slowed down to the normal autorotational flight R. P. M. At the lower coning or flapping angle the blades have higher pitch because of the obliquity of the flapping axis (when viewed in plan), thereby augmenting the thrust of the rotor, especially at the initiation of the jump.

In addition to the independent or individual effects and advantages of the drag and flapping pivots above referred to, the conjoint use of these two pivots (especially when combined with controllable pitch change of the blades for direct take-off) still further affords a number of important advantages, as follows:

Bearing in mind that lag-lead movement about the drag pivot is accompanied by a component of flapping movement about the drag pivot axis (*d—d*), it will be seen that a given lag-lead movement will cause the blade mounting fork to move about the axis *f—f* of the flapping pivot. In analyzing the sense in which this action takes place, it must be remembered that the action of centrifugal force on the blade normally tends to maintain the blade in a plane perpendicular to the hub axis. Therefore, while a leading movement of the blade about the drag axis *d—d* is accompanied by a component of downward swinging movement of the blade about that axis, the action of centrifugal force resists the downward swinging movement and, therefore, causes the blade mounting fork to swing upwardly about the axis *f—f* of the flapping pivot. Conversely, while a lagging movement of the blade is accompanied by an upward swinging movement on the drag hinge, the action of centrifugal force actually results in a downward swinging movement of the blade mounting fork about the axis of the flapping pivot.

Similar but inverted effects take place when the blade tends to move about the flapping axis. That is, movement of the blade about the flapping axis *f—f* in either direction tends to cause the blade to move about the drag axis *d—d*, although the magnitude of the compound effect is very much smaller in this latter sense, as will appear below.

The foregoing interaction of the drag and flapping pivots, for convenience, is hereinafter termed the "dog-leg" action.

Certain effects of the dog-leg action with the particular inclinations and obliquities of the pivots herein illustrated will now be considered.

When the aircraft is in translational flight, each blade experiences a cycle of flapping movement, the high and low points of which are generally diametrically opposite to each other in the circle of rotation, with the high point occurring at an azimuth in the neighborhood of 30° beyond the forwardmost position of the blade and the low point generally 30° beyond the rearwardmost position of the blade. This flapping movement, which is an incident to differential lift compensation in translational flight, is normally accompanied by certain lag-lead tendencies of each blade which, with certain pivot arrangements, would be accommodated by lag-lead movement of the blade about the axis of a drag pivot. In the arrangement herein described, however, substantial movement of the blade about the drag axis to accommodate lag-lead movement of the character normally accompanying flapping movements incident to differential lift compensation is undesirable for the reason that lag-lead movement about the inclined drag axis (*d'—d'*) would introduce a secondary pitch change effect about the flapping axis *f—f* by virtue of the dog-leg action. Such secondary pitch change movement has a tendency to set up vibrations and resonance conditions. Even though the pivot arrangement of the present invention utilizes an inclined drag pivot (so as to secure the independent primary advantages characteristic thereof) the undesirable secondary pitch change effect is substantially eliminated by virtue of the employment of a flapping pivot which is obliquely inclined to the plane perpendicular to the hub axis, i. e., forwardly and upwardly with respect to the blade. This particular inclination of the flapping pivot causes the blade (when it flaps upwardly or downwardly during differential lift compensation) to move in a path having lag-lead components of motion of magnitude and direction approximating those lag-lead motions which the blade would tend to assume under the influence of the lag-lead forces normally accompanying such flapping movement. By virtue of this, lag-lead movement of the blade about the drag axis under these conditions is reduced and, in turn, the secondary pitch change effect introduced by the dog-leg action is also reduced.

I have found that the above effect is attained in an arrangement as shown in which the primary obliquity of the flapping axis f—f (when viewed in plan) is such as to make an acute angle of approximately 60° with the longitudinal axis b—b of the blade at the leading side of the latter; and in which the secondary obliquity of the flapping axis (with respect to a plane perpendicular to the hub axis h—h) is such as to form an angle in the neighborhood of 7½°. It should be understood, however, that a number of characteristics of the particular blades employed will affect the desirable secondary angle, as will also, to a minor degree, the angle chosen for the primary obliquity.

At this point it may be noted that when in flight position the inclination of the drag pivot axis (d'—d') with reference to the plane perpendicular to the hub axis h—h is desirably in the neighborhood of 45° (see Figure 3), and for at least most purposes herein contemplated, it is preferable that the drag pivot axis should be generally perpendicular to the longitudinal axis b—b of the blade, since obliquity with respect to the blade axis would again introduce secondary pitch change effects.

Another desirable effect of the conjoint use of the inclined drag and flapping pivots disclosed herein arises when the rotor brake is applied to slow down and stop the rotor after a landing has been made. The torque effect of application of the rotor brake causes the blade to move to a leading position about the drag axis d—d and with the particular inclination of the drag axis disclosed, the dog-leg action accompanying this leading movement causes the blade mounting fork to swing upwardly about the flapping axis f—f which brings about decrease of blade pitch and thus "spills" the lift, this being desirable upon making a landing, in order to avoid unintentional re-take-off and to reduce the danger of turning over in a high wind.

While certain of the independent advantages of a drag pivot inclined with respect to the plane perpendicular to the hub axis h—h may be achieved with a drag pivot inclined either upwardly and rearwardly or upwardly and forwardly, I prefer the latter arrangement (as illustrated herein) when the oblique drag pivot is combined with controllable blade pitch change for direct take-off, as herein disclosed. In connection with the relationship between the drag pivot and the pitch change mounting for the blade, it should be noted that the drag pivot is located outboard of the pitch change pivot. In consequence of this, when the blade pitch is reduced for driving the rotor when on the ground in preparation for direct take-off, the drag pivot axis is shifted in a direction so that its angle with respect to the plane perpendicular to the hub axis h—h is reduced. This new position of the drag axis is indicated at $d^2$—$d^2$ in Figure 3. This results in introduction of an increased centrifugal restoring moment acting in a vertical plane, i. e., acting to center the blade with respect to flapping above or below the plane of rotation. In turn, this reduces lag-lead movement of the blade when the rotor is being driven on the ground in preparation for take-off and consequently reduces the magnitude of the dog-leg action and its attendant pitch variation. The advantage of this when driving the rotor on the ground is reduction of vibrations or fluctuations of forces acting on the blades which tend to break into resonance and set up what has been termed "ground resonance."

With regard to the point last mentioned, attention is called to the fact that the invention provides another stabilizing means serving to reduce ground resonance, i. e., the friction device which is associated with the drag pivot.

While frictional restraint has heretofore been applied to other types of drag pivots, especially the type in which the pivot axis is arranged to lie in a plane containing the longitudinal axis of the blade and the hub axis, that friction has been applied heretofore chiefly to accomplish what is herein accomplished by virtue of inclination of the drag axis with respect to the vertical. For that purpose, the prior arrangements have employed a relatively heavy frictional restraint.

I have found that certain vibrational effects, especially when the rotor is being driven on the ground at zero pitch, are quite surprisingly reduced by employing the combination of a forwardly and upwardly inclined drag pivot, together with a moderate frictional restraint about the drag axis, i. e., a frictional restraint in the neighborhood of one-tenth of that heretofore employed in rotors in which the drag pivot axis was located in a plane containing the longitudinal blade axis and the hub axis.

The magnitude of the frictional restraint applied in accordance with the present invention is not such as to materially affect those force compensating movements of the blades in the lag-lead sense which accompany certain conditions of operation, such as flight maneuvers. The friction device here contemplated is rather of the nature of a vibration absorber which apparently damps out minor blade movements, originating possibly from minor fluctuations of driving torque, which otherwise have a tendency to build up into a ground resonance condition.

Flight tests of a rotor incorporating the various pivot arrangements above described have demonstrated an unusual degree of smoothness of operation, not only in high speed translational flight, but also when driving the rotor on the ground at zero pitch in preparation for effecting the direct take-off.

I claim:

1. For an aircraft, a bladed sustaining rotor incorporating mechanism for mounting a blade on the rotor hub including a flapping pivot the axis of which when viewed in plan makes an acute angle with the longitudinal axis of the blade at the leading side of the latter, and a drag pivot the axis of which lies substantially in a plane perpendicular to the blade axis but is inclined with respect to a plane perpendicular to the hub axis in a direction upwardly and forwardly of the blade.

2. An aircraft rotor blade mounting mechanism in accordance with claim 1, in which the axis of the flapping pivot is further inclined with respect to a plane perpendicular to the axis of the hub in a direction upwardly and forwardly of the blade.

3. An aircraft rotor blade mounting mechanism in accordance with claim 1, further characterized by location of the drag pivot axis outboard of the flapping pivot axis.

4. An aircraft rotor blade mounting mechanism in accordance with claim 1, further characterized by location of the flapping pivot axis in a position slightly radially offset from the hub axis.

5. An aircraft rotor blade mounting mechanism in accordance with claim 1, in which the axis of the flapping pivot is further inclined with respect to a plane perpendicular to the axis of the hub in a direction upwardly and forwardly of the blade and in which the included angle between the flapping pivot axis and the longitudinal axis of the blade at the leading side of the latter (when viewed in plan) is approximately 60°, and the angle of the flapping pivot axis with reference to the plane perpendicular to the axis of rotation is approximately 7½°.

6. An aircraft rotor blade mounting mechanism in accordance with claim 1, and further incorporating yieldingly resistive means associated with the drag pivot to yieldingly resist movement of the blade about the axis thereof.

7. An aircraft rotor blade mounting mechanism in accordance with claim 1, and further incorporating a device providing for pitch change movement of the blade substantially about its own longitudinal axis, said device being operatively interposed between the drag pivot and the hub and providing for change of blade pitch between a positive pitch angle position for flight and a pitch angle position approximating zero lift for drive of the rotor on the ground in preparation for take-off, whereby the axis of the drag pivot is shifted to lie closer to a plane perpendicular to the hub axis when the blade is in the second mentioned position than when in the position of flight pitch.

8. For an aircraft, a bladed sustaining rotor incorporating mechanism for mounting a blade on the rotor hub including pivot means providing for compensation of differential lift effects in translational flight, a drag pivot the axis of which lies substantially in a plane perpendicular to the blade axis but is inclined with respect to a plane perpendicular to the hub axis in a direction upwardly and forwardly of the blade, and a device providing for pitch change movement of the blade substantially about its own longitudinal axis, said device being operatively interposed between the drag pivot and the hub and providing for change of blade pitch between a positive pitch angle position for flight and a pitch angle position approximating zero lift for drive of the rotor on the ground in preparation for take-off, whereby the axis of the drag pivot is shifted to lie closer to a plane perpendicular to the hub axis when the blade is in the second mentioned position than when in the position of flight pitch.

9. An aircraft rotor blade mounting mechanism in accordance with claim 8, and further incorporating yieldingly resistive means associated with the drag pivot to yieldingly resist movement of the blade about the axis thereof.

10. An aircraft rotor blade mounting mechanism in accordance with claim 8, and further incorporating a friction device associated with the drag pivot and resisting movement of the blade about the axis of the drag pivot.

11. For an aircraft, a bladed sustaining rotor incorporating a rotative hub mounted for tilting movement in all directions about a point located on the axis of rotation, and mechanism for mounting a blade on the hub including a flapping pivot providing primarily for upward and downward swinging movements of the blade, the axis of the flapping pivot being slightly radially offset from the center of tilt of the hub and slightly vertically offset above said center of tilt, the radial and vertical offsets being of magnitude such that, with the blade in its normal average coning position of flight, the inward extension of the longitudinal axis of the blade contains said center of tilt.

12. An aircraft rotor blade mounting mechanism in accordance with claim 11, in which the axis of the flapping pivot when viewed in plan makes an acute angle with the longitudinal axis of the blade at the leading side of the latter and in which the axis of the flapping pivot is further inclined with respect to a plane perpendicular to the axis of the hub in a direction upwardly and forwardly of the blade.

13. An aircraft rotor blade mounting mechanism in accordance with claim 11, and further including a drag pivot the axis of which lies substantially in a plane perpendicular to the blade axis but is inclined with respect to a plane perpendicular to the hub axis in a direction upwardly and forwardly of the blade, and in which construction the axis of the flapping pivot when viewed in plan makes an acute angle with the longitudinal axis of the blade at the leading side of the latter and in which the axis of the flapping pivot is further inclined with respect to a plane perpendicular to the axis of the hub in a direction upwardly and forwardly of the blade.

14. In an aircraft sustaining rotor having a generally upright hub and a blade rotatable about the axis of the hub, a blade mounting assembly comprising a flapping pivot whose axis is oblique to the blade axis, a pitch changing pivot whose axis approximately coincides with the blade axis, and a drag pivot whose axis when projected on a plane perpendicular to the blade axis and containing the hub axis is oblique to the hub axis.

15. A construction according to claim 14, wherein said pivots are operatively interposed between the hub and the blade in the order named, beginning at the hub.

16. A construction according to claim 14, wherein the obliquity of the flapping pivot is such that an acute angle is included between its axis and the blade axis at the leading side of the blade as viewed in plan, and that an acute angle is included between its axis and a plane perpendicular to the hub axis above said plane and forwardly of the blade axis as viewed along said blade axis, and wherein the obliquity of the drag pivot is such that its axis is perpendicular to the blade axis and at its upper end slopes forwardly in the direction of rotation.

17. A construction according to claim 16, wherein the first mentioned obliquity of the flapping pivot axis is of the order of 60° and the second mentioned obliquity is of the order of 7½°, and wherein the obliquity of the drag pivot axis is of the order of 45°.

AGNEW E. LARSEN.